United States Patent
Biegel

(12) 
(10) Patent No.: US 7,274,574 B1
(45) Date of Patent: Sep. 25, 2007

(54) MAGNETICALLY CONTROLLED TRANSFORMER APPARATUS FOR CONTROLLING POWER DELIVERED TO A LOAD WITH CURRENT TRANSFORMER FEEDBACK

(76) Inventor: George E. Biegel, 26875 La Alameda, #1033, Mission Viejo, CA (US) 92691

( * ) Notice: Subject to any disclaimer, the term of this patent is extended or adjusted under 35 U.S.C. 154(b) by 0 days.

(21) Appl. No.: 11/433,869

(22) Filed: May 15, 2006

(51) Int. Cl.
*H02M 3/335* (2006.01)
*G05F 1/14* (2006.01)

(52) U.S. Cl. .................. 363/16; 363/21.09; 363/21.16; 363/25; 323/255; 315/224

(58) Field of Classification Search .................. 363/16, 363/21.08, 21.09, 21.16, 21.17, 24, 25, 133; 323/250, 355, 358; 315/306, 307, 308, 224, 315/209 R
See application file for complete search history.

(56) References Cited

U.S. PATENT DOCUMENTS

| 4,002,963 | A | * | 1/1977 | Hunter ........................ 363/80 |
| 4,393,157 | A | * | 7/1983 | Roberge et al. ............. 323/355 |
| 5,740,021 | A | * | 4/1998 | Lecheler et al. .............. 363/37 |
| 6,072,710 | A | * | 6/2000 | Chang .................... 315/209 R |

* cited by examiner

Primary Examiner—Jessica Han
(74) Attorney, Agent, or Firm—Charles Bickoff

(57) ABSTRACT

A circuit with a magnetically variable transformer having primary and secondary windings wound on a magnetic core wherein the transformer core with associated windings is placed in close proximity to an independently wound control coil. The transformer core is placed within the bore of the control coil and an optional focusing armature concentrates the magnetic field at the poles. Application of a control current forms poles at the control coil extremities and causes a change in permeability of the transformer core thereby altering the power output of the transformer inversely to the magnitude of the control current. The control current from the output of the secondary coil of a current transformer in series with the load and conditioned by a feedback conditioning circuit modulates the level of the control current. The magnetically variable transformer controls a D.C. to A.C. inverter circuit, which is useful in supplying power to a fluorescent lamp and other A.C. receptive loads. Additionally, a microprocessor optionally modulates the feedback from the secondary of the current transformer while receiving inputs from manual and automatic environmental controls.

8 Claims, 3 Drawing Sheets

MAGNETICALLY CONTROLLED TRANSFORMER APPARATUS FOR CONTROLLING POWER DELIVERED TO A LOAD WITH CURRENT TRANSFORMER FEEDBACK

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention pertains to the field of Inverter Circuits used to convert direct current, D.C., to alternating current, A.C. In general, such apparatus have been designed to receive a D.C. input, which in turn is converted to an A.C. source suitable for driving an A.C. receptive load. The disclosed apparatus controls the inverter circuit by altering the magnetic characteristics of the transformer, which supplies the base current to the inverter transistors or equivalently, the voltage to the source of MOSFET power transistors. The alteration of the magnetic characteristics of the transformer is facilitated by a voltage derived from a current transformer in series with the A.C. receptive load.

2. Prior Art

A common power inverter application is to provide compatible A.C. power to operate fluorescent lamps, Cold Cathode Fluorescent lamps, and electro-luminescent panels, halogen lamps, H.I.D. lamps, Metal Halide lamps, and switching power supplies. Fluorescent lamps are commonly used to provide illumination, particularly in industrial environments where their economy of power utilization is highly desirable. Because of their greater efficiency in converting electricity to light, the cost of utilization is significantly reduced when compared to incandescent lighting.

Cold Cathode Fluorescent lamps (CCFLs) are used to backlight Liquid Crystal Displays (LCDs) in computer applications and Electro-luminescent (EL) panels are used to backlight LCDs, key switches, and other devices in many applications. Their popularity is due to high efficiency and small size. These devices require a high voltage ac current to drive them. Power inverter circuits commonly supply this power.

A common limitation of these devices has been that they have required sophisticated circuitry to vary the brightness of the above-mentioned lamps. Most modern fluorescent lamp ballasts utilize a D.C. to A.C. inverter circuit to strike and supply operating power to the lamps. Many inverter circuits commonly supply a non-variable voltage to the load. As control circuitry is added to accomplish regulation or dimming of the light source, the complexity and cost has historically increased dramatically while the reliability and manufacturing consistency have decreased. Additionally the control circuitry often interacts in an undesirable manner with various aspects of the circuitry thereby requiring further complexity to compensate for these effects.

Likewise, switching power supplies and high frequency supplies for driving halogen lamps commonly suffer from the same limitations.

The present invention addresses the above limitations in several ways. The first is that the apparatus described herein is isolated and independent from the drive circuitry. It requires very few components and does not require complex feedback loops to control the inverter output level. Secondly, when used to drive a fluorescent lamp load, a series resonant circuit comprised of an inductor and resonant capacitor is often used to boost the voltage level to that required to strike and operate the lamp. By adding Current Transformer in series with the lamp, a secondary coil is used to generate a feedback voltage, this voltage can be used to supply the control current on a delayed basis and thereby provide full start up power to the fluorescent lamp load independent of the setting of any dimming or level controls. Alternatively, in conjunction with a simple RC timer, the modified inverter circuit is also able to strike the lamps at a very low dimming level. Additionally the feedback voltage can be supplied to a variety of feedback circuits to condition the signal or feed it through a microprocessor to tailor the input to supply the desired effect. Various input devices can be used to control the output level.

BRIEF SUMMARY OF THE INVENTION

The invention herein described is for a circuit, which utilizes a magnetically controlled output transformer, which is useful to control the power level supplied to fluorescent lamps, LCDs, and Electroluminescent lamps, halogen lamps, H.I.D. lamps, Metal Halide lamps. It also has uses in controlling the output power level in switching power supplies. The method utilized in controlling the power output involves applying an external non-coupled controlling magnetic field to the core of the transformer. The present invention includes a magnetic means to control the power output of a secondary winding of a transformer having a control winding on a core independent of the core upon which the primary and secondary windings of the output transformer are wound. The control winding being wound on an independent core does not induce a voltage in either the primary or the secondary windings of the transformer. The magnetic field generated by the control winding acts as a magnetic valve to control the circulation of flux in the core of the output transformer by the application of a D.C. voltage to the control winding which creates a polarized field in the portion of the transformer core adjacent to the polarizing control core. One embodiment of output transformer is a toroid placed within a bobbin wound with the control winding. A soft iron core forms a pair of poles to shunt and concentrate the flux at the toroid. A second embodiment of output transformer involves the control coil being wound on a soft iron core wherein a pair of poles are placed across the extremities of the transformer core. In a third configuration, a control coil without benefit of focusing poles is placed close to the core of the transformer to control the permeability of the core.

The control current supplied to the control winding is provided by a current transformer placed in series with the load. The current transformer has at least one secondary winding which supplies a current proportional to the load current and is conditioned by appropriate circuitry to provide a DC signal of sufficient amplitude to be useful to control the magnetically controlled output transformer.

Additionally, this apparatus provides a magnetic means for controlling the base currents supplied by a transformer to a pair of inverter transistors which in-turn control the A.C. voltage applied to a load. The load may be a gas discharge lamp. The control circuit can also provide a dimming or brightness control function with a variable resistor, thermistor, or light sensitive resistor to control the voltage and current supplied to the control coil.

The purpose of the disclosed invention is to firstly maintain the output of the load and secondly in a further embodiment allow the input of various sensors and adjustment means to vary the output to the load in a predetermined or manually determined way.

DETAILED DESCRIPTION OF THE INVENTION

The following description illustrates the invention by way of example, not by way of limitation the principles of the invention. The description will clearly enable one skilled in the art to make and use the invention. It describes embodiments, variations, and adaptations including what I believe to be the best mode.

Figure 1:
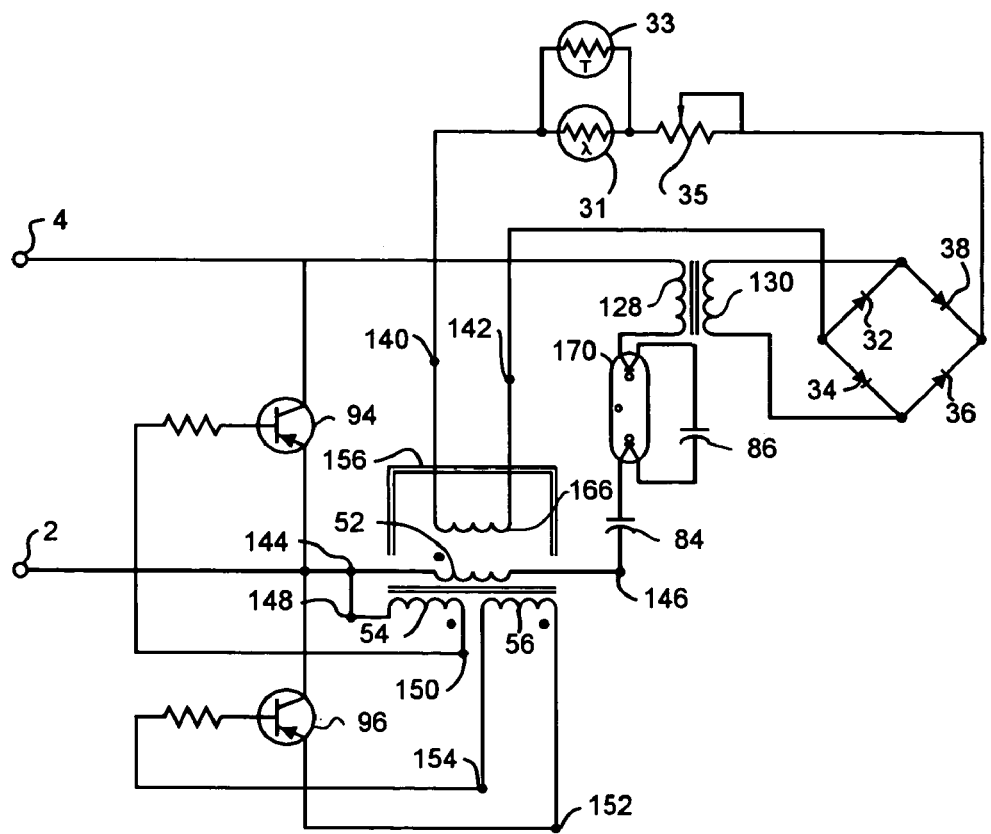
FIG. 1 is a prior art schematic of an inverter circuit with magnetic control of control signals of a pair of inverter transistors wherein the control winding is wound on a bobbin and the output transformer is placed within the bore of the winding. Control elements serve to regulate the current flowing through the control winding.

FIG. 1 depicts a circuit with an electrically isolated magnetically coupled control coil in the construction of the output transformer. This transformer construction consists of a core cooperatively wound with a primary 52 and at least one secondary winding. In the configuration depicted, there are two secondary windings, 54 and 56, each of which are connected respectively to the base of an inverter transistor with the windings oppositely poled such that the outputs are out of phase. This allows the inverter transistors, 94 and 96, to be turned on and off out of phase and alternately create the positive and negative A.C. half cycles. Inductor 128 and capacitor 84 form a series resonant circuit useful for boosting the inverter output to a high voltage high frequency signal necessary to drive the lamp 170 without flicker. A starting capacitor 86 is connected across the lamp load to provide a warming current for the filaments in the lamp. Initially the lamp 170 has high impedance, which allows the capacitor 86 to rapidly charge and provide this current. Upon striking, the lamp impedance decreases dramatically limiting the charging current to capacitor 86.

Figure 2:
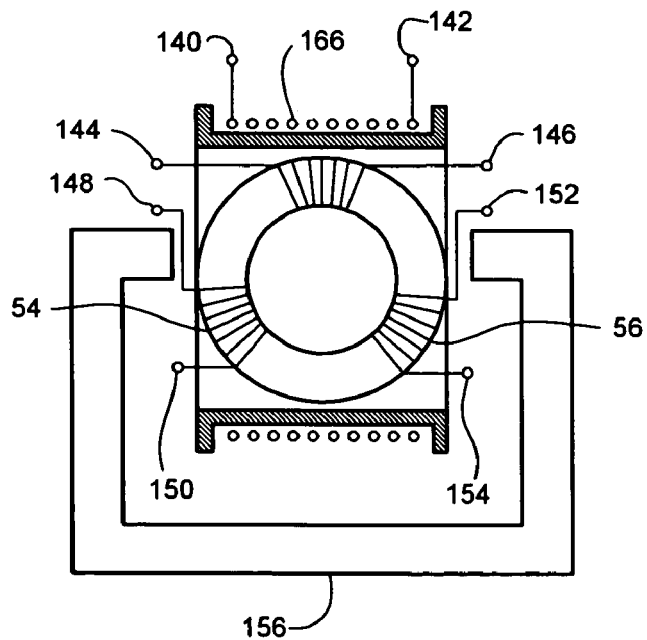
FIG. 2 is a partially sectioned plan view of the output transformer arrangement showing the output transformer arranged within a bobbin upon which is wound the control coil. A magnetic shunt concentrates the magnetic control field at substantially opposing points on the circumference of the output transformer.
Figure 4:
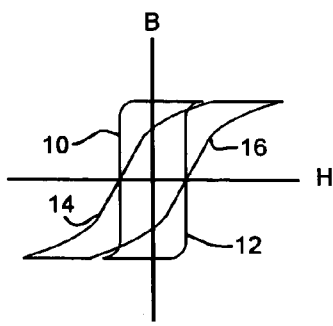
FIG. 4 is a B/H curve showing the change in coercivity due to the influence of an externally applied magnetic field.

As stated above the transformer is constructed in this case having a primary 52 and two secondaries 54 and 56. The output transformer consisting of the primary 52 and secondary windings, 54 and 56, are wound on a core and is placed within the bore of a bobbin wound with the control coil 166. Optionally a magnetic concentrator 156 as shown in FIG. 2 focuses the magnetic field at the opposite ends of the bobbin in close proximity to the core and windings of the output transformer. For clarity, the control coil is sectioned to show the arrangement of the transformer within the control coil. Applying a D.C. voltage to the control coil 166 through coil leads 140 and 142 causes an apparent change in permeability. The application of a D.C. current or low frequency A.C. current to the control coil 166 produces a magnetic field across the poles. When placed in close proximity to the transformer core, increasing the field strength increases the apparent permeability of the transformer core thereby reducing the current output and power from the secondary windings while maintaining the voltage, which is a function of the primary to secondary, turns ratio. In effect, the north pole of the control core generates a south pole adjacent to it in the transformer core and likewise the south pole of the control core generates a north pole adjacent to it in the transformer core. FIG. 4 shows a B/H curve representation wherein the curve bounded by 10 and 12 represents the magnetic characteristics of the transformer core prior to the application of the control current while the B/H curve bounded by 14 and 16 depict the characteristics after the application of the control current. The creation of these poles in effect changes the permeability of the transformer core and the output current varies inversely with respect to the permeability.

B=flux density; H=magnetic intensity; μ=permeability; l=length of the mean magnetic path; and i=current; N=number of turns $$H=B/\mu=Ni/l$$

$$\therefore i=Bl/\mu N$$

Additionally, inductor 130, when wound on the same core as inductor 128 forms the secondary of a voltage reduction transformer. This high frequency, greater than 20 KHz, A.C. output voltage when rectified by rectifier formed by diodes 32, 34, 36, and 38 serves as the control voltage that supplies control coil 166. As stated above, when the circuit initially starts, the lamp impedance is very low and inductor 128 will be close to saturation. This will result in a very low voltage in the secondary 130. The result will be that full startup power will be applied to the lamp load at full brightness. As the impedance of the lamp increases the voltage in the secondary will ramp up to the value preset by the turn ratio and the control coil 166 will bring the lamp brightness to the set dimming level. Due to the high frequency of the control voltage, a filter capacitor is unnecessary, as noticeable flicker will not occur at 20 kHz. There is no power in the dimming circuit if the lamp 170 is disconnected or a filament fails at end of life.

FIG. 1 also shows control current modifying elements 31, 33, and 35. These resistive elements vary their resistance with respect to light, temperature, or adjusted resistance. As the resistance of these elements increase, the control current will decrease and the output current of the output transformer will increase, thereby increasing the brightness of the lamp 170. Inversely when the resistance of these elements decrease, the control current will increase and the output current of the output transformer will decrease, thereby decreasing the brightness of the lamp 170. These elements may be utilized singularly or in series or parallel combinations to achieve the desired control results. The use of the light sensitive resistor can control the power output of the transformer based on the light output of the lamp or the ambient light level. In the first case, the current will be adjusted to keep the light output constant while in the second case the brightness might be adjusted inversely to the ambient light level. The thermistor might be used to provide maximum current at low temperatures to assure starting while reducing the current at higher temperatures. The variable resistor allows the lamp to be dimmed according to the desired level of light. It will be recognized by those familiar with the art that other control elements, which actively or passively vary the magnitude of the control current, are applicable to the scope of the invention. It will also be recognized by those skilled in the art that the invention is not limited to toroidal transformers as shown in the figures, but that other core arrangements consistent with the intent of the present invention are applicable.

Figure 3:
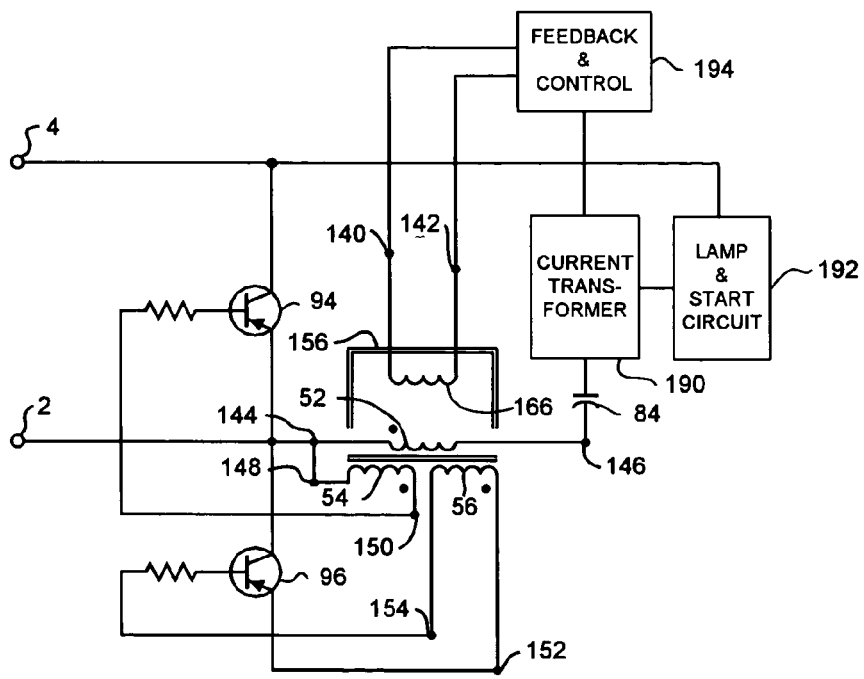
FIG. 3 is a simplified schematic of an inverter circuit with magnetic control of the base currents of a pair of inverter transistors. The control winding is wound on an independent core, which is magnetically coupled to the core of the output transformer. Control elements serve to regulate the current flowing through the control winding. A current transformer, Lamp and Starting Circuit, and Feedback and Control are shown as blocks to be further described in additional Figures.

FIG. 3 shows a variation of FIG. 1 wherein the circuit functions represented as "Feedback and Control", "Current Transformer", and "Lamp & Start Circuit" are depicted as functional blocks. The "Feedback and Control" is replaced in the alternative by FIGS. 5, 6, 7, 8, or 9.

Figure 5:
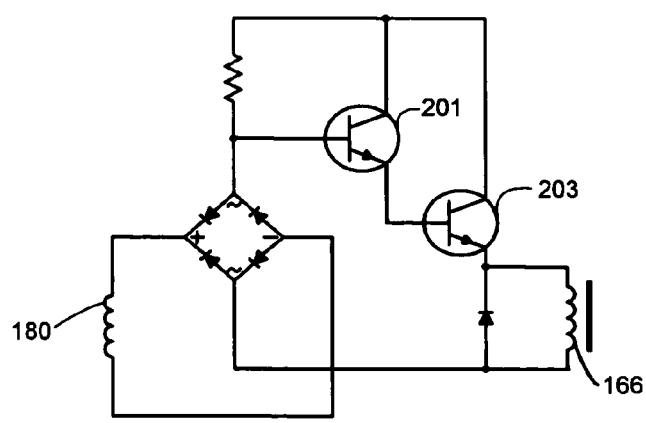
FIG. 5 is a schematic of a DC (Direct Current) coupled Feedback and Control Circuit.

FIG. 5 shows a circuit useful for D.C., direct current, coupling of the feedback coil 180 of the current transformer 190 to the control coil 166. The voltage supplied by feedback coil 180 is amplified by a single stage or multiple stage transistor network shown in FIG. 5 as 201 and 203 providing an output voltage proportional to the voltage generated by feedback coil 180.

Figure 6:
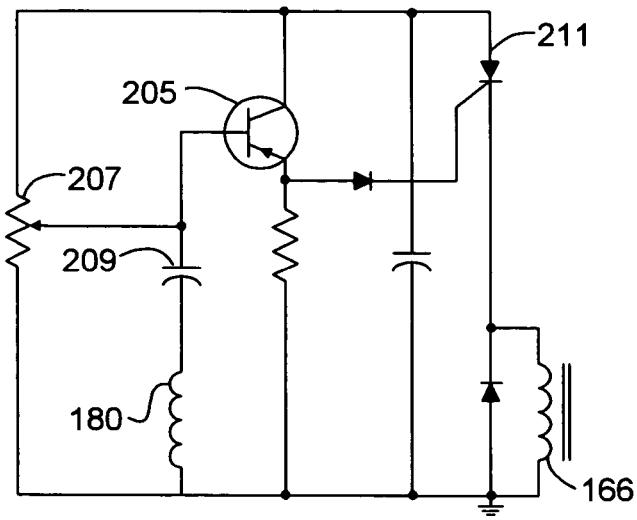
FIG. 6 is a schematic of an AC (Alternating Current) coupled Feedback and Control Circuit.

FIG. 6 shows a circuit useful for A.C., alternating current, coupling of the feedback coil 180 of the current transformer 190 to the control coil 166. The voltage supplied by feedback coil 180 is used to set the frequency of the output of the transistor 205 regulated by the RC network connected to the transistor base. Resistor 207 and capacitor 209, wherein resistor 207 may be variable to adjust the frequency, form the RC network. The output of transistor 205 is then used to switch the SCR 211 on to provide power to the control coil 166.

Figure 7:
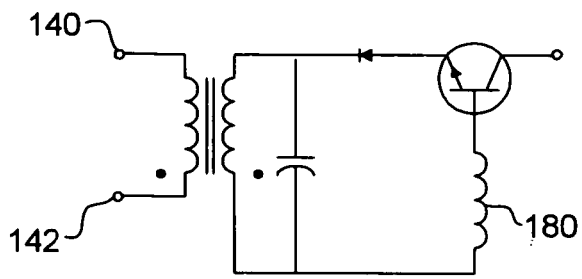
FIG. 7 is a simplified schematic showing to control the power level delivered to the control coil from the current transformer.

FIG. 7 shows a circuit wherein the voltage from the feedback coil 180 of the current transformer 190 is boosted by transistor 217 and transformer 219 to the control coil 166 and is rectified by diode 214 and filtered by capacitor 216. This method directly controls the voltage level delivered to the lamp 170 and maintains the lamp level based upon the voltage developed in the feedback coil 180 of the current transformer 190.

Figure 8:
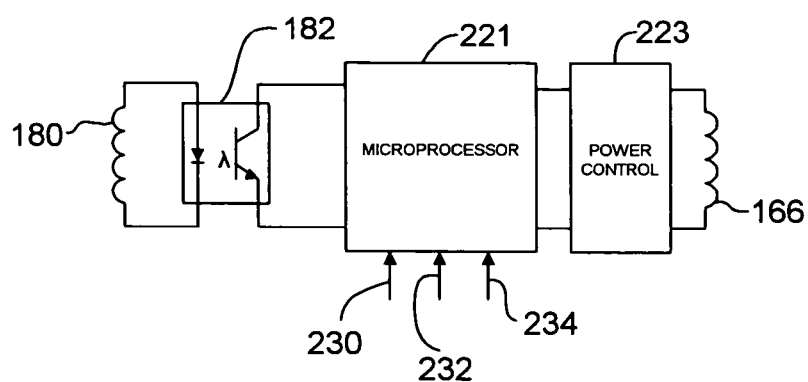
FIG. 8 shows feedback control of the control transformer by a microprocessor optically coupled to the current transformer and showing inputs.

FIG. 8 shows a circuit wherein the signal from the feedback coil 180 of the current transformer 190 is conditioned by a microprocessor or micro controller 221 to deliver a signal to the control coil 166. The microprocessor or micro controller 221 may be optically coupled to the feedback coil 180 of the current transformer 190 in order to isolate it from noise spikes in the voltage or voltage levels inconsistent with those required as inputs to the microprocessor or micro controller 221. The microprocessor or micro controller 221 may further receive inputs from a temperature controller, ambient light controller, manual control, scheduled controller, sensory and control elements such as a resistive control, a light sensor, a temperature sensor or other devices required by the application to control or maintain the light level. The input may be singular or a plurality as shown in FIG. 8 as inputs 230, 232, and 234. The microprocessor or micro controller 221 is further connected to power control circuitry as depicted in FIG. 5 through FIG. 7 to interface the microprocessor or micro controller 221 to the control coil 166.

Figure 9:
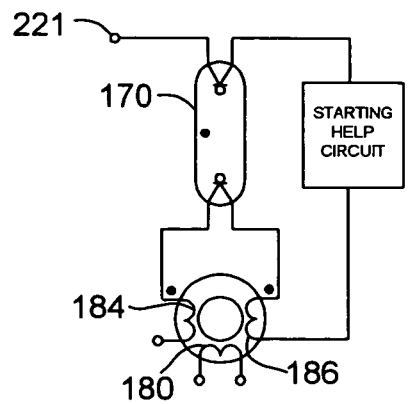
FIG. 9 shows a fluorescent or ccfl lamp in a rapid start configuration. The lamp has a pair of windings of the current trans former in series with the lamp with a third winding providing a feedback voltage to the feedback and control circuit.

FIG. 9 shows a configuration of "Current Transformer 190" and the "Lamp and Start Circuit 192" wherein the Lamp 170 is in a Rapid Start arrangement. The start circuit in rapid start is generally a capacitor, the value of which is chosen to provide approximately 300 volts across the lamp. This configuration generally provides a striking time of approximately one second.

Figure 10:
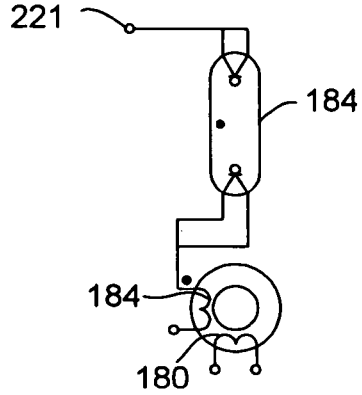
FIG. 10 shows a fluorescent or ccfl lamp in an instant start configuration. The lamp has a single winding of the current trans former in series with the lamp with a second winding providing a feedback voltage to the feedback and control circuit.

FIG. 10 shows a shows a configuration of "Current Transformer 190" and the "Lamp and Start Circuit 192" wherein the Lamp 170 is in an Instant Start arrangement. Instant Start requires the provision of approximately 600 volts across the lamp. This configuration generally provides a striking time of approximately 500 milliseconds.

Current feedback from a secondary of the control transformer controls or maintains the light level by monitoring current delivered to the primary of the current transformer in series with the load. The level is maintained by feeding back the current from the secondary modulated by circuits depicted in FIGS. 5, 6, and 7. Modification of the light level is accomplished by processing inputs to the microprocessor from sensors and controllers as depicted in FIG. 8 and modifying the feedback current according to programmed parameters.

As will be obvious to persons skilled in the art, various modifications, adaptations, and variations of the specific disclosure can be made without departing from the teaching of the invention.

The invention claimed is:

1. A circuit having a variable transformer, a current transformer, and a feedback circuit for supplying a feedback controlled current to a load wherein;

said variable transformer consists of:

a magnetic core upon which is wound at least one primary coil for receiving an input voltage;

said magnetic core additionally having at least one secondary coil for supplying an output voltage proportional to a turns ratio defined by the number of turns of the secondary coil in the numerator to the number of turns of the primary coil in the denominator and a primary current;

said magnetic core being fabricated from a magnetically soft material;

a control coil proximate to and physically isolated from the magnetic core of said variable transformer wherein said physical isolation of said control coil beneficially assures electrical isolation from said primary coil and said secondary coil of said variable transformer;

said control coil receiving a control current from said feedback circuit wherein said control current generates a magnetic field;

said magnetic field causing a change in permeability of the magnetic core of said variable transformer in a physically non-coupled manner wherein said permeability in said magnetic core is increased as said control current in said control coil increases;

said output voltage of said variable transformer decreases with the increase of said permeability;

said current transformer having at least one primary winding and a plurality of secondary windings:

said primary winding of the current transformer receiving a current from the secondary coil of the variable transformer; wherein a first secondary winding serving to provide a feedback current to the control coil of said variable transformer;

additional secondary windings being optionally provided for input to one of the group consisting of an external controller, a microprocessor, and a monitoring system; and said feedback circuit useful for conditioning said feedback current from said current transformer and being chosen from the group consisting of a DC coupled feedback and control circuit, an AC coupled feedback and control circuit, and an optically coupled microprocessor feedback and control circuit.

2. The load of claim 1 being chosen from the group consisting of fluorescent lamps, Cold Cathode Fluorescent lamps, and electro-luminescent panels, halogen lamps, H.I.D. lamps, Metal Halide lamps, and switching power supplies.

3. The variable transformer of claim 1 having one primary coil for receiving an input voltage and said at least one secondary coil is a first secondary coil and a second secondary coil each supplying said output voltage and current;

said first secondary coil and said second secondary coil being wound on said core of magnetic material common to said primary coil to produce voltages out of phase from one another;

said first secondary coil and said second secondary coil each communicatingly control an inverter circuit for producing a high voltage high frequency A.C. power source;

a first end of said first secondary coil is communicatingly attached to a base of a first inverter transistor and second end of said first secondary coil is attached to a ground voltage and a collector of a second inverter transistor;

a first end of said second secondary coil is communicatingly attached to a base of said second inverter transistor and a second end of said second secondary coil is attached to an emitter of said second inverter transistor;

a positive D.C. voltage being supplied to a collector of said first inverter transistor and a ground voltage being supplied to a junction of an emitter of said first inverter transistor and a collector of said second inverter transistor;

said collector of said first inverter transistor is communicatingly attached to a first terminal of a series resonant inductor having a second terminal attached to a first terminal of a load;

a second terminal of said load is attached to a first terminal of a series resonant capacitor while a second terminal is attached to a first terminal of the primary of said variable transformer;

a second terminal of the primary of said variable transformer is attached to said ground voltage;

said inverter circuit for producing a high voltage high frequency A.C. power source is controlled through the application of said control current from one of the group of a D.C. source and a low frequency A.C. source to a pair of input terminals of said control coil;

said control current creating a magnetic field for controlling the permeability of said magnetic core wherein an output power of said inverter circuit is controlled;

said A.C. power source providing said output power inversely proportional to said control current of said variable transformer; and said A.C. power source in series with the primary of said current transformer being suitable for supplying a controllable power level to an A.C. receptive load.

4. The inverter circuit of claim 3 wherein said control current supplied to the control coil of said variable transformer is fed back from a secondary winding of said current transformer interposed by said feedback circuit.

5. The circuit of claim 1 wherein said optically coupled microprocessor feedback and control circuit has a sensor and control element input wherein said sensor and control element input is either singular or in the plurality;

said sensor and control element input chosen from a group consisting of a temperature controller, an ambient light controller, a manual controller, scheduled controller, and sensory and control elements; and said sensory and control elements chosen from a group consisting of a resistive control, a light sensor, a temperature sensor and other devices required by the application to control or maintain the light level.

6. The microprocessor feedback and control circuit of claim 1 wherein it is used alone or in combination with a feedback circuit chosen from the group consisting of a DC coupled feedback and control circuit, an AC coupled feedback and control circuit.

7. The variable transformer of claim 3 having a winding serving as a current source for an inverter circuit and also having a primary winding and at least two secondary windings for supplying a pair of inverter transistor base currents;

a series resonant inverter circuit for producing a high voltage high frequency A.C. power source is controlled through the application of said control current from one of the group of a D.C. source and a low frequency A.C. source to a pair of input terminals of said control coil;

said control current creating said magnetic field for controlling the permeability of said magnetic core wherein an output power of said series resonant inverter circuit is controlled; and said A.C. power source providing said output power inversely proportional to said control current of said variable transformer.

8. The inverter circuit of claim 7 wherein said control current supplied to the control coil of said variable transformer is controllably modulated by said feedback circuit.

* * * * *